United States Patent
Kusnierek et al.

(10) Patent No.: US 10,160,053 B1
(45) Date of Patent: Dec. 25, 2018

(54) COLD GAS BLAST JET FOR MICRO-ELECTRONIC SOLDER REPAIR

(71) Applicants: John Jerome Kusnierek, Springfield, OH (US); Jeffrey Richard DeWispelaere, Elk River, MN (US)

(72) Inventors: John Jerome Kusnierek, Springfield, OH (US); Jeffrey Richard DeWispelaere, Elk River, MN (US)

( * ) Notice: Subject to any disclaimer, the term of this patent is extended or adjusted under 35 U.S.C. 154(b) by 0 days.

(21) Appl. No.: 15/713,625

(22) Filed: Sep. 23, 2017

(51) Int. Cl.
*B23K 1/00* (2006.01)
*B23K 1/018* (2006.01)
*B23K 3/06* (2006.01)
*B23K 101/40* (2006.01)

(52) U.S. Cl.
CPC .......... *B23K 3/0607* (2013.01); *B23K 1/0016* (2013.01); *B23K 2101/40* (2018.08)

(58) Field of Classification Search
CPC .............................. B23K 1/018; B23K 2201/42
See application file for complete search history.

(56) References Cited

U.S. PATENT DOCUMENTS

| | | | |
|---|---|---|---|
| 3,653,572 A | 4/1972 | Sherman | |
| 4,187,972 A | 2/1980 | Vella | |
| 4,412,641 A | 11/1983 | Fuchs | |
| 5,152,447 A | 10/1992 | Wallgren | |
| 5,465,186 A * | 11/1995 | Bajorek | G01R 33/09 29/603.04 |
| 5,746,367 A | 5/1998 | Pai | |
| 6,119,919 A * | 9/2000 | Kasulke | B23K 1/018 219/229 |
| 6,349,871 B1 * | 2/2002 | Card, Jr. | B23K 1/012 228/119 |
| 7,829,817 B2 | 11/2010 | Zakel | |

FOREIGN PATENT DOCUMENTS

DE     19639993 A1     10/2000

* cited by examiner

*Primary Examiner* — Erin B Saad

(57) ABSTRACT

One embodiment of a robust process for the repair of a solder bridge defect in a Surface Mount Technology microelectronic circuit assembly with fine pitch components. The defective solder joint is heated by various means and a cold gas jet blast is applied to the defective solder joint. An effect is created whereby the solder inducing the defect is conveyed away by the impact of the cold gas jet blast. The advantages of this embodiment include scalability for pin spacing and elimination of heat induced latent defects. The process is applicable to any pin spacing, but is of particular usefulness with pin spacing of 0.025 inch or finer. Other embodiments are described and shown.

2 Claims, 9 Drawing Sheets

COLD GAS BLAST JET FOR MICRO-ELECTRONIC SOLDER REPAIR

TECHNICAL FIELD

Figure 1:
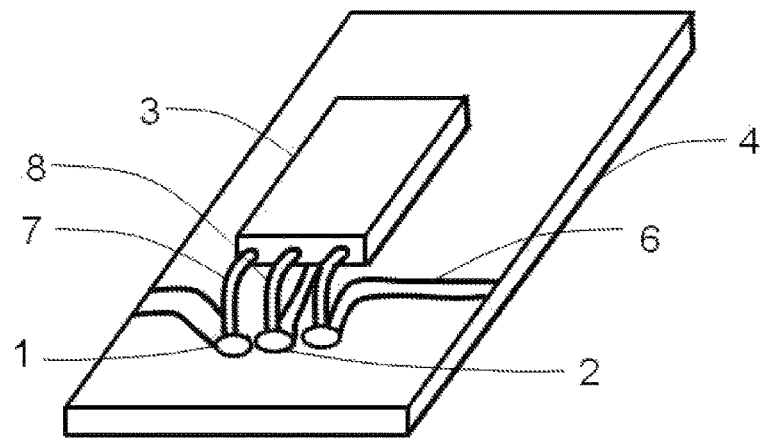

Manufacturing Micro-Electronic Circuit Assemblies—Rework and Repair of Defective Bridged Solder Joints.

BACKGROUND

Prior Art

US patents

| Pat. No. | Kind Code | Issue Date | Patentee |
| --- | --- | --- | --- |
| 5,152,447 | A | Oct. 6, 1992 | Wallgren |
| 3,653,572 | A | Apr. 4, 1972 | Sherman |
| 7,829,817 | B2 | Nov. 9, 2010 | Zakel |
| 5,746,367 | A | May 5, 1998 | Pai |
| 4,187,972 | A | Feb. 12, 1980 | Vella |
| 4,412,641 | A | Nov. 1, 1983 | Fuchs |

Foreign Patent Documents

| Foreign Doc. Nr. | Ctry Code | Kind Code | Pub. Dt. | App. or Patentee |
| --- | --- | --- | --- | --- |
| 19639993 | DE | A1 | Oct. 5, 2000 | Geloff |

In the manufacture of micro-electronic circuit assemblies using Surface Mount Technology (SMT) with electronic components such as fine pitch connectors, microprocessors, integrated circuits assembled on types of circuit board such as fine pitch flexible circuits such as those with 0.025 inch pin spacing or smaller and fine pitch hard circuit boards, a common defect category for those skilled in the art is the bridged solder joint. This defect consists of excess solder filling in the space between component leads causing a short circuit. These defects typically occur near the end of the manufacturing value cycle and therefore the full value of the circuit is placed at risk from the defect.

Existing processes to fix this defect, salvage the circuit assembly, and hence recover the value of the SMT micro-electronic circuit assembly have low yield success rates. In much of the prior art, additional defects are introduced by the repair process as various parts of the assembly are overheated. Additionally, in many operations the lack of a reliable repair process leads to the defect being assessed as un-repairable and thus the entire micro-circuit assembly is scrapped. Significant material, efficiency, and financial losses occur as a result.

Prior art to solve this problem have utilized several different methodologies of an obvious nature. For example, a jet of superheated gas at a temperature of more than 600 F is caused to flow onto the defect area for a period of time. The intention with this approach is to use the superheated air to both elevate the solder temperature to phase change from solid to liquid and to put pressure on the liquid solder to convey the excess solder material away and remove it from the defect site. A variation on this is to use a mechanical suction device applied closely to the defect site to suction the liquefied solder as the superheated air liquefies the solder. The disadvantages of this for those skilled in the art is that application of superheated air causes component heating well outside of the defect zone either from the size of the gas stream in relation to the components or the circulation of the heated gas after it has flowed over the defect zone. The disadvantage becomes progressively worse as the SMT electronic micro-circuit component spacing becomes smaller. The overall impact is that several component or solder joints can be affected including those solder joints without defects with the disadvantageous effect of introducing component failure due to overheating. Using superheated gas also involves the significant expense of storing, creating, and handling the superheated gas as well as dealing with the requirement for the superheated gas flow to be of a small diameter and be precisely aimed at the defect site. An additional disadvantage is that use of an inert gas is needed to prevent the hot gas from reacting with the solder or other components in the micro-electronic circuit assembly.

Less expensive prior art to solve this problem have involved liquefying the solder joint by the mechanical application of heat via a heated metal device while at the same time using a suction device. The mechanical heating device can encompass the application of heat and a suction channel in the same device. A significant disadvantage is that the minimum size of the suction channel is limited by the viscosity of the liquefied solder. Therefore as the state of the art in micro-electronic circuits progresses to smaller component spacing this embodiment becomes unusable or suffers low success rate. In other embodiments, this method may be combined with a laser that melts the solder to prepare it for removal by suction. However, this method creates difficult challenges associated with the laser beam being obscured from the defect solder by the suction device, the solder being suctioned, or the haze caused by solder paste.

Additional prior art to solve this problem includes the use of a metallic mesh wick such as copper to form a capillary channel to convey the liquefied solder from the defect site. Again, as with other prior art, a separate mechanical application of heat to the solder joint along with concurrent use of the mesh or the heating and capillary functions may be contained in the same device. In other embodiments, this method may be combined with a laser that actually melts the solder to prepare it to be removed by the capillary action. Again, a significant disadvantage is that the minimum size of the capillary channel is limited by the viscosity of the liquefied solder and hence the capillary suction pressure that can be achieved. Again, therefore as the state of the art in micro-electronic circuits progresses to smaller component spacing, this embodiment becomes unusable or suffers low success rate.

The new embodiment contained in this document is applicable to most circuit and component geometries and solder joint shapes. This said embodiment has a high yield success rate for those skilled in the art and can reduce scrap rates from bridged solder joints to very low levels. From initial test data on 20 SMT connectors of 60 pins each with 0.020 inch pitch, 100% of the 242 solder bridge defects were effectively repaired. Below SMT component lead pitches of approximately 0.025 inch, the said embodiment process may be the only practical way to repair circuits with the solder bridge defect. Additionally, as economic and manufacturing trends drive SMT pin pitch spacing to smaller levels, the solder bridge defect both becomes the dominant defect and increases in frequency.

SUMMARY

In accordance with one embodiment a method for the repair of bridged solder joint defects on SMT micro-electronic circuit assemblies comprises the heating of the solder defect to a liquid state and the use of a cold gas blast jet of cool and high velocity gas to convey the defect from the defect site.

ADVANTAGES

Accordingly several advantages of one or more aspects are as follows; to provide a means to remove the solder bridge defect in SMT micro-electronic assemblies, that provides a high probability of success, that reduces scrap rates in SMT micro-electronic assemblies due to solder bridge defects, that provides reduced risk of overheating and damaging electronic components during the repair, that is applicable to hard-circuit boards, flex-circuits, and connectors, that provides a means for multi-pin original manufacture soldering of micro-electronic circuit assemblies with small conductive pin spacing such as less than 0.025 inch. Other advantages of one or more aspects will be apparent from a consideration of drawings and ensuing description.

DRAWINGS—REFERENCE NUMERALS

Figure 2:
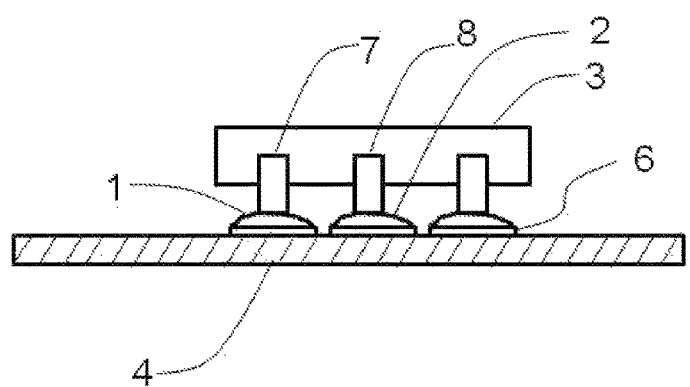
Figure 3:
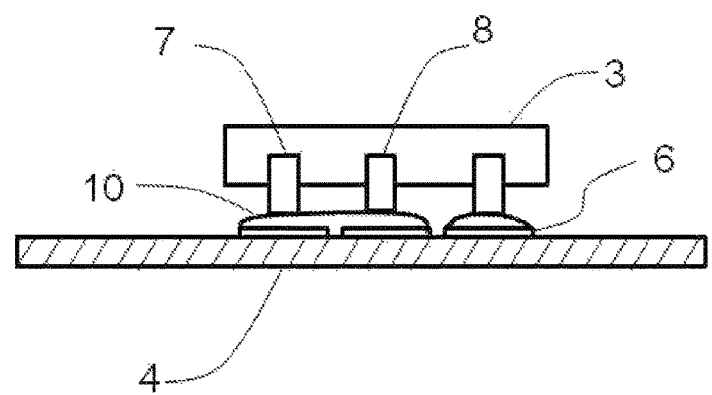
Figure 4:
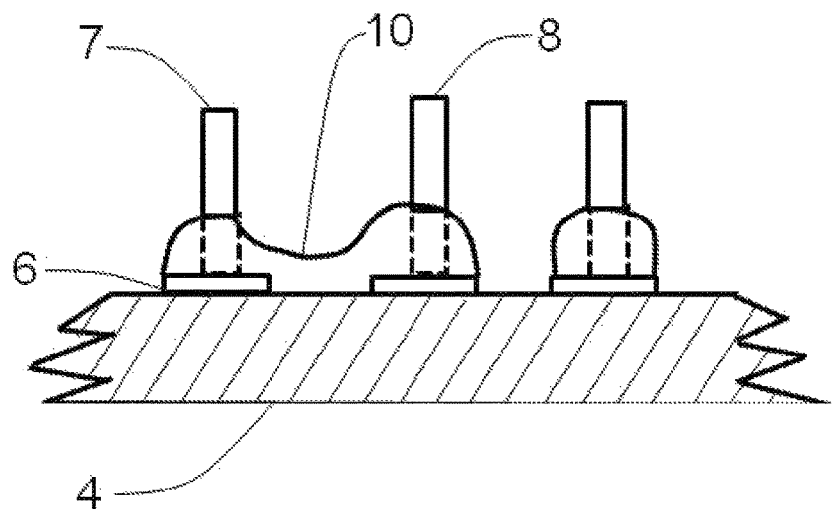
Figure 5:
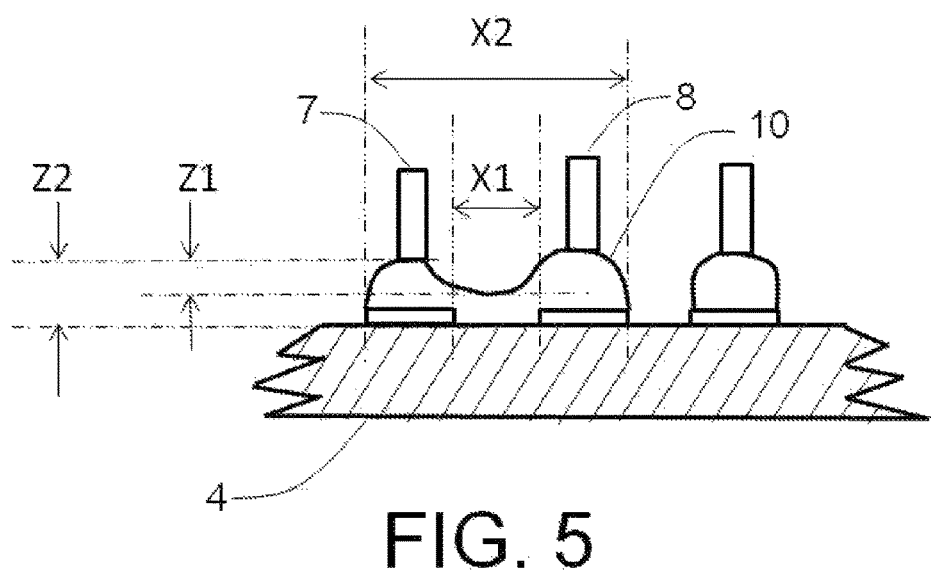
Figure 6A:
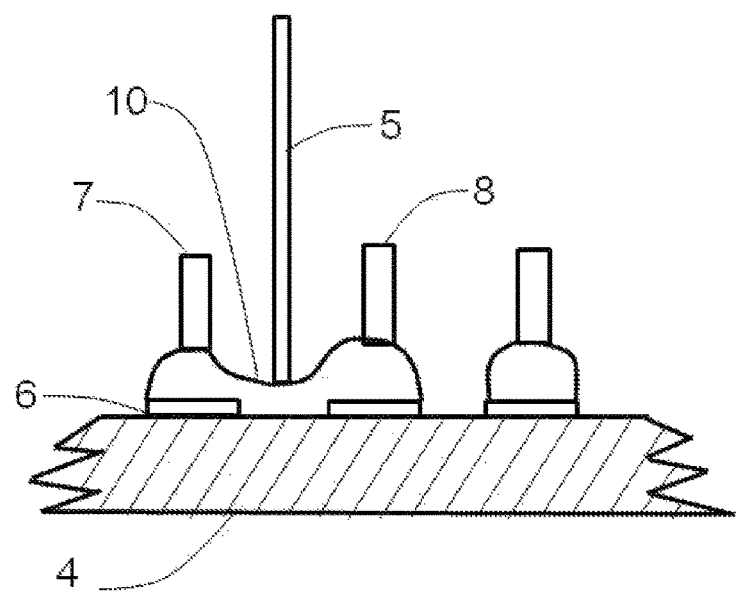
Figure 6B:
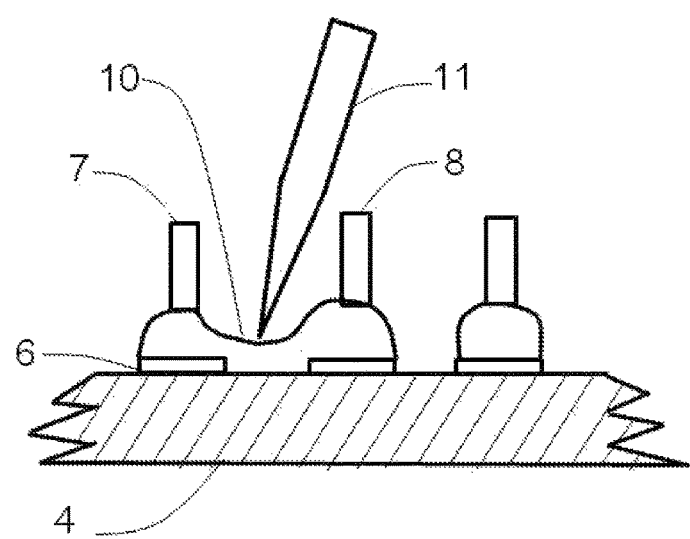
Figure 7:
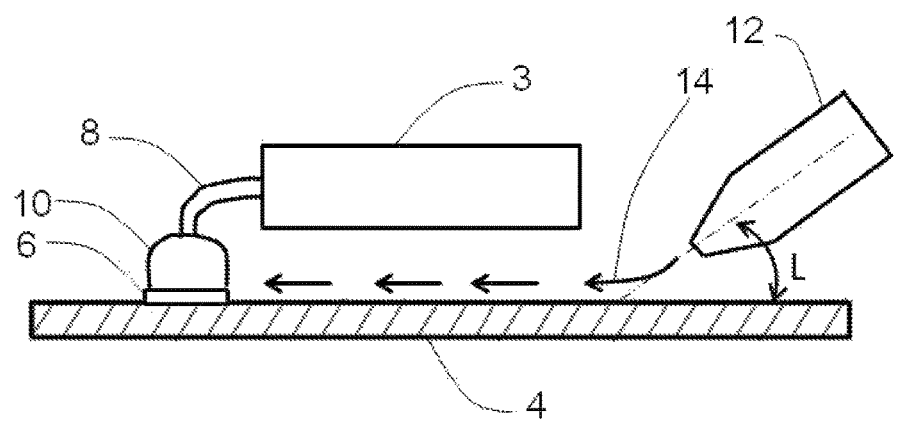
Figure 8:
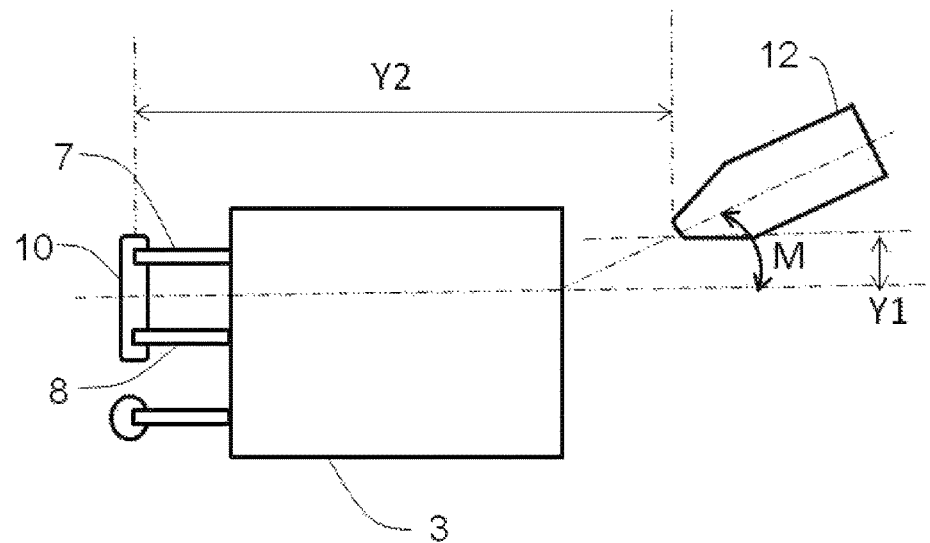
Figure 9A:
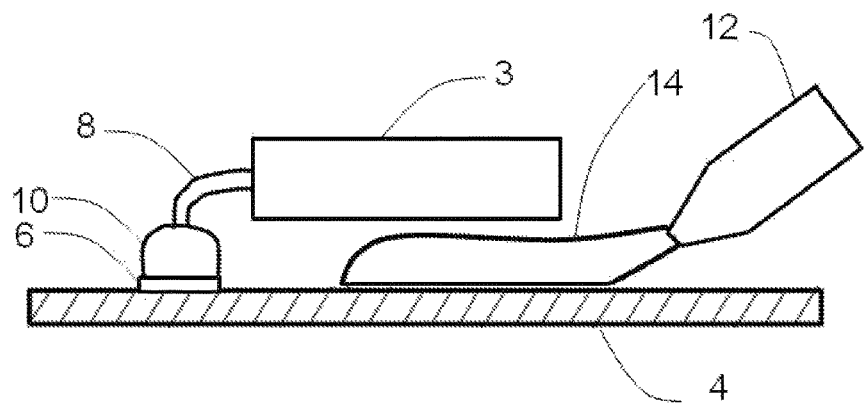
Figure 9B:
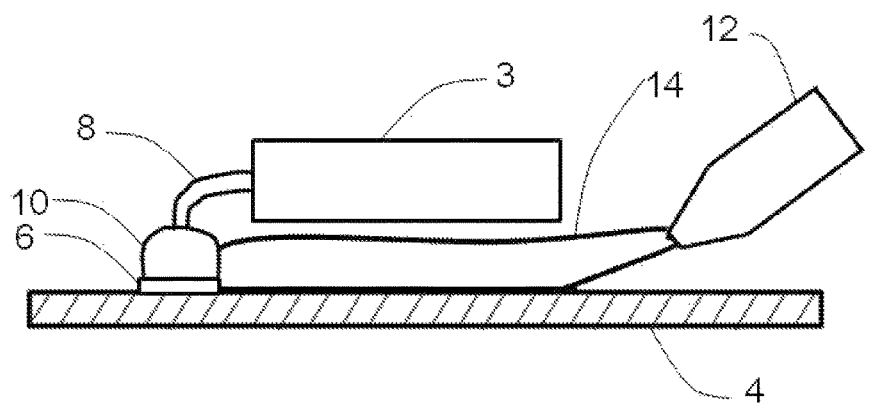
Figure 9C:
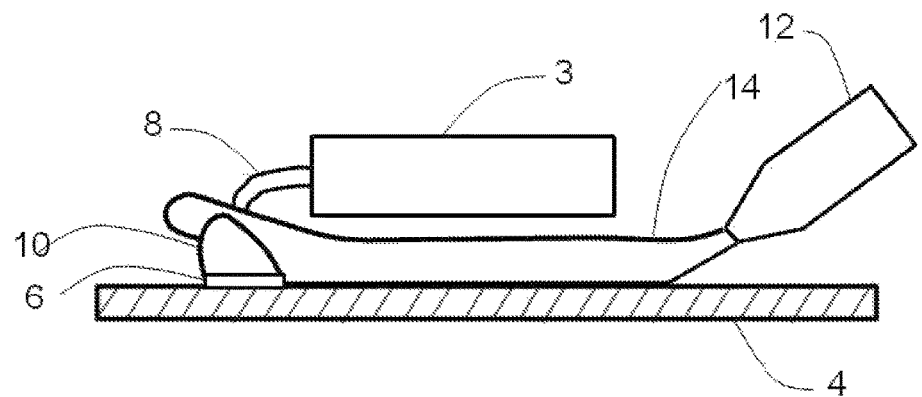
Figure 9D:
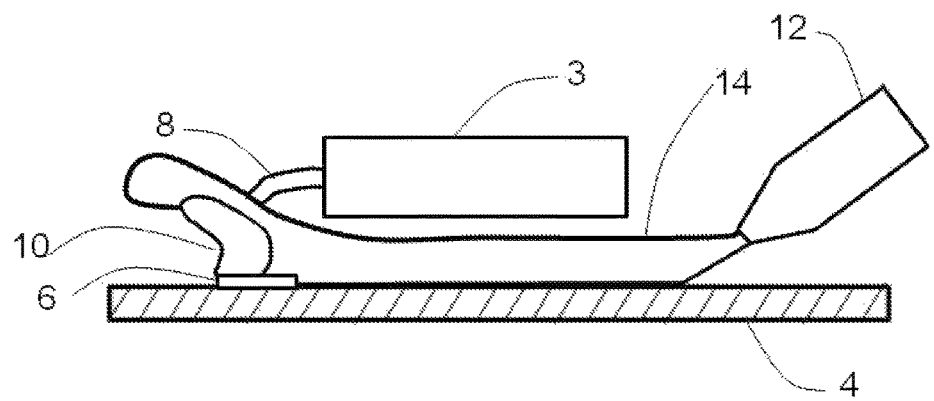
Figure 9E:
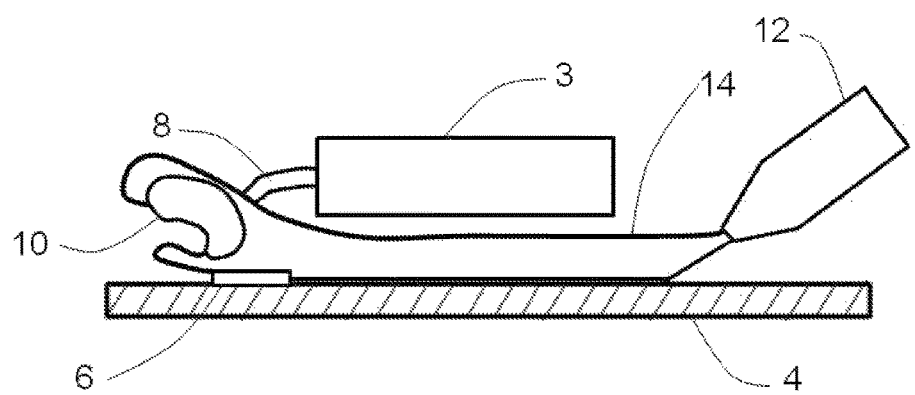
Figure 9F:
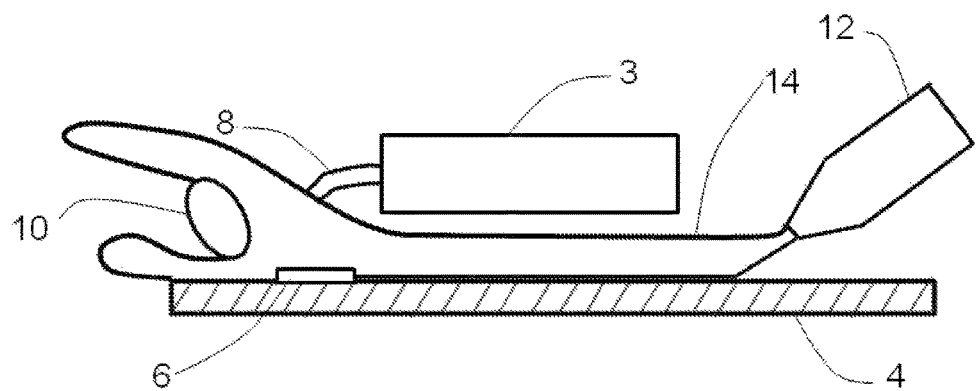

FIG. 1 Isometric View Assembly No-Defect
FIG. 2 Front View Assembly No-Defect
FIG. 3 Front View Assembly Defect
FIG. 4 Front View Defect Site
FIG. 5 Front View Defect Site Parameters
FIG. 6A Front View Defect Site Application of Laser Heat Source
FIG. 6B Front View Defect Site Application of Mechanical Conductive Probe Heat Source
FIG. 7 Side View Application of Cold Gas Blast Jet
FIG. 8 Top View Application of Cold Gas Blast Jet
FIG. 9A Side View The Effect of Cold Gas Blast Jet—Approach to Defect Site
FIG. 9B Side View The Effect of Cold Gas Blast Jet—Initial Impact
FIG. 9C Side View The Effect of Cold Gas Blast Jet—Initial Deformation and Translation
FIG. 9D Side View The Effect of Cold Gas Blast Jet—Continued Deformation and Translation
FIG. 9E Side View The Effect of Cold Gas Blast Jet—Separation of Defect Solder
FIG. 9F Side View The Effect of Cold Gas Blast Jet—Conveyance of Defect Solder

DETAILED DESCRIPTION—FIRST EMBODIMENT

As shown in FIG. 1, a typical SMT micro-electronic circuit assembly has a nonconductive board (4) and conductive traces (6), various types of through hole and surface mount micro-electronic components (3), and conductive pin or pins (7) and (8) which are soldered resulting in both electrical conduction and structural bonding at (1) and (2). In manufacturing of this SMT circuit assembly, a successful solder operation is depicted in FIG. 2 while a defective solder operation is shown in FIG. 3. The defect shown in FIG. 3 is that pins (7) and (8) are conductively connected by excess solder (10) which is typically called a "solder bridge" or just "bridge" by those skilled in the art. Therefore, typical conforming geometry and joint shape are shown in FIG. 2 while typical defective geometry and joint shape are shown in FIG. 3.

The said embodiment assumes standard inspection processes have detected, located, and characterized the defect to that of a bridged solder joint. Standard post operation inspection processes are assumed as well. Standard safety precautions should be followed for eye protection, venting of solder flux fumes and shielding from melted solder spall as conveyed by the Cold Gas Blast Jet.

Process Step 1

The solder bridge may come in different shapes and FIG. 4 shows an illustrative shape. The solder bridge defect should be examined to determine Z1 divided by Z2 as shown in FIG. 5. In cases where Z1 divided by Z2 in FIG. 5 is greater than approximately 30%, additional solder may be added to the defective joint. This is counter-intuitive in that it appears to make the defect worse, but in the said embodiment, it functionally provides an increased impact zone for the cold gas blast jet in later steps. The added solder is such that the solder joint is built up so that Z1 divided by Z2 in FIG. 5 is less than approximately 30%. Depending on the exact dimensions of the pin spacing and size of the solder defect, this step may be omitted.

Process Step 2

As shown in FIG. 6A, a laser beam (5) of beam width, wavelength, and intensity is applied such that the solder bridge defect is liquefied. The minimum extent of the liquification is X1 as shown in FIG. 5 to a maximum extent of X2. The liquification of the solder with a laser is achievable by those skilled in the art and this process step is entirely compatible with the automated use of lasers as the method for heating the defect site to solder liquification temperature. The process is insensitive to the rate of liquification of the solder. Laser application of heat to solder joints as part of this embodiment can support micro-electronic component and pin spacing repair beyond the current state of the art. The key advantage is that heat is only being applied to the bridge defect site and not untargeted areas such as adjacent pins and not electronic components.

In cases where the use of a laser or lasers to liquefy the defective solder joint is not practical or achievable, this process step can be performed as shown in FIG. 6 B with a mechanical conductive heat probe (11) or solder iron. Overall the process can use any method to melt the solder. Again, the minimum extent of the liquification is X1 as shown in FIG. 5 to a maximum extent of X2. The probe temperature is can be adjusted so as to gain the right solder viscosity and working time for the application of the cold gas blast jet. The correct probe temperature is achievable by those skilled in the art. Again, the key advantage is that heat is only being applied to the bridge defect site and not untargeted areas such as adjacent pins and not electronic components which could damage those areas.

Process Step 3

This is a precursor to step 4. In the case of the use of a laser to liquefy the solder, the laser may be turned off or allowed to stay on during Step 4. In the case where the solder has been liquefied with a mechanical conductive probe, the heated metallic probe may remain in place or be withdrawn from the defect site. Other methods of melting the solder may be used and adapted with this process.

Process Step 4

A blast jet of cold gas is caused to be directed to the defect site as shown in FIG. 7 and FIG. 8 by nozzle (12) causing The Effect upon the solder as described herein;

The solder has a structural attractive bond with the pins (7) and (8) and the conductive traces (6), but does not have an attractive bond with a circuit board area without a conductive trace (4). However, the liquid solder does have an internal attraction to itself from its own surface tension and viscosity and will not naturally leave the bridge area even though it is liquid. The impingement of the cold blast gas jet (14) on the defective solder joint causes the liquid solder that is unsupported by pins in the bridge area to be conveyed out and away from the joint as shown in FIGS. 9A, 9B, 9C, 9D, 9E and 9F. Counter intuitively, the cold gas blast jet does this before the cold gas causes the solder to cool and solidify in the defect site and hence remaining attached to the circuit as a defect. The Effect is that while the cold gas blast jet does cool the solder, the gas blast wave, following gas velocity, and heat transfer area as shown in FIGS. 9A, 9B, 9C, 9D, 9F, and 9F is such that the solder remains above the melting point and hence a viscous liquid while it is being impacted by the gas jet and conveyed from the defect site.

As shown in FIG. 9A, the cold gas jet blast (14) approaches the solder bridge defect site and makes initial contact as shown in FIG. 9B with one side of the solder bridge. As shown in FIG. 9C, the impact of the cold blast jet causes a force to be placed onto the solder bridge and the solder bridge begins deforming and translating. As shown in FIG. 9D, the momentum imparted by the cold gas blast jet causes the solder bridge to deform and translate further even as the cold gas blast now flows around the solder bridge. This deformation and translation continues until the solder bridge is entirely separated from the defect site while the solder from the solder bridge is still in liquid state. As shown in FIG. 9F, after leaving the defect site and with cold gas flowing around it, the solder then cools to below melting temperature and solidifies again after it is away from the defect site.

There is no structural bonding between the solder and the portion of the circuit board without a conductive trace thereby the area between the pads has no residual solder defect and the short circuit defect is removed. The important aspect is that the cold gas blast jet performs this operation without additionally heating the pins, pads, board, or other components in SMT micro-circuit assembly and thus eliminates the risk of the repair process itself causing a new defects in the micro-circuit assembly from excess heat.

Typical key parameters of the cold gas blast jet are as follows;
1. Nominal Room Temperature of 50 F to 100 F
2. Geometric extent of cold gas jet of 2 times X1 to 10 times X1
3. Velocity of cold gas approximately 200 m/s
4. Blast front rise time of cold gas approximately 0.1 seconds or less
5. Duration of cold gas jet flow of approximately 0.1 to 1.0 seconds
6. Nozzle Angle L of approximately 30 deg in either direction
7. Nozzle Angle M of approximately 0 deg to 30 deg
8. Nozzle Displacement Y1 of approximately 10 times X2
9. Nozzle Displacement Y2 of approximately 2 times X1
   Notably and advantageously, the process is insensitive to the geometric extent of the gas blast jet stream, the nozzle geometric placement, the nozzle angle, and the nozzle shape. The process is also insensitive to the relationship of the pin pitch to gas jet velocity as long as it is above approximately 200 m/s and below sonic velocity. This makes the process robust as these parameters are easily achieved by those skilled in the art.

An additional advantage as shown in FIG. 7, is that the cold blast jet can be used to go under, around, or past a SMT micro-electronic component (3) in order to convey the defect solder material away in such a way as to prevent lodging in other parts of the micro-circuit assembly and without damaging the component from excess heat as would be caused by a superheated gas flow.

The process is sensitive to the gas blast jet front rise time, but in practice this is easily achieved. As an example, experimental data shows that the gas blast jet should go from zero to 100% flow in less than 0.1 second using air as the gas to cause The Effect upon the melted solder.

Additionally, those skilled in the art can use standard industrial vacuum techniques along with shaped deflectors to capture the conveyed solder particles. Further, covering various parts of the circuit assembly with electrostatic discharge, safe covers, or tape may be used for process enhancement to avoid introducing conveyed conductive material in other areas of the micro-circuit assembly.

Process Step 5

In most instances the bridge has been removed and a conforming solder joint remains thus completing the said embodiment. In the cases where excessive solder has been stripped from pins (7) and (8), reapplication of solder is possible to complete a conforming solder joint. In rare instances where the defect was not completely removed, the said embodiment can be applied to the defect site again with high confidence that excess heat has not damaged the micro-circuit assembly.

Additional Embodiments

There are various possibilities with regard to the said embodiment process which may be adapted to and advantageous for challenging fine pitch SMT micro-circuits with pin spacing less than 0.010 inch. In this embodiment, the original manufacturing process is changed such that the part or pin is placed and then soldered with an above normal volume of solder and then a cold gas jet blast is used to trim the solder down to correct volume levels to include conveying out any bridges which could cause a defect. For smaller spaced circuit assemblies, in this way the cold gas blast jet is being used to manipulate the extent and even shape of the solder joint. At still smaller circuit assemblies, mechanical application of solder to the joint as a net-shape may not be possible or economically prohibitive. The cold gas jet blast, because the placement of The Effect on the solder is only fundamentally limited by the size of the gas molecules, can be an economical way for circuit manufacture with pin spacing below approximately 0.010 inch.

The least expensive gas for the said embodiment is air. However, inert gases such as nitrogen may be used to achieve specific effects such as reduction in oxidation of the solder in the rework area. Reactive gases such as formic acid vapor may be used also where fluxless soldering or other attributes are desired.

The geometry of the operation relative to the gravity vector may be changed to aid the removal of the bridged solder and reduce contamination potential from the conveyed solder.

The entire process may be performed manually or robotically and has the significant advantage of high success rate (in terms of repaired circuits), robustness, and substantial reduction in the rate that the repair or manufacturing process introduces new defects.

Advantages

From the description above, a number advantages of some embodiments of our cold blast jet solder process become evident;

a) A high success rate repair process for bridged solder joints in SMT micro-electronic circuits which dramatically reduces the scrap rate and associated costs of producing SMT micro-electronic assemblies containing the bridged solder joint defect.

b) A repair process which is lower cost in that no expensive hot gas handling or specialized suction or capillary mechanical devices are required.

c) A repair process for solder bridges which is applicable to SMT pin spacing or pin pitch which is at and beyond current state of the art for micro-electronic circuit assemblies.

d) A new process for the original manufacture of SMT micro-electronic circuit assemblies with pin spacing finer than current state of the art which in turn has significant implications for the capability and cost of SMT micro-electronic circuit assemblies.

CONCLUSION, RAMIFICATIONS, AND SCOPE

Accordingly, the reader will see that the cold gas blast jet can be used to repair an SMT micro-electronic circuit assembly that contains the multiple or single defect of a bridged solder joint. In addition, said embodiment, because it does not introduce excessive heat, greatly reduces the occurrence of defects caused by the repair process which becomes a major factor with conductive pin spacing is at state of the art or finer.

Furthermore, the cold gas blast jet has the additional advantages that;

It retains a high success rate even as pin spacing is reduced in a given SMT micro-electronic circuit assembly.

It is completely compatible with or advantageous to laser soldering processes.

Although the description above contains many specificities, these should not be construed as limiting the scope of the embodiments but as merely providing illustrations of some of several embodiments. For example, the repair process is applicable to SMT micro-electronic circuit assemblies with electronic components such as fine pitch connectors, microprocessors, integrated circuits assembled on types of circuit board such as fine pitch flexible circuits (0.025" pin spacing or smaller) and fine pitch hard circuit boards (typically 0.025" pin spacing or smaller). The scope of the embodiments should be determined by the appended claims and their legal equivalents, rather than by the examples given.

What is claimed is:

1. A method for repair of micro-electronic assemblies with installed surface Mount Technology components containing a defect of a solder bridge between two or more electrically conductive circuit board pads and device pins comprising:

a. purposefully increasing the defect by introducing additional solder to the solder bridge to increase an impact area for cold gas blast jet;

b. protecting all non-defect areas of the micro-electronic part from solder that is to be blasted out of a defect area;

c. heating the defect area with a laser beam or metal object such that the defect solder bridge and additional solder is liquefied;

d. directing the cold gas blast jet onto the said liquefied solder bridge defect and additional solder with a rise time of approximately 0.1 seconds with a velocity of approximately 200 meters per second and a cold temperature gas of 50 degrees Fahrenheit to 100 degrees Fahrenheit whereby the said solder defect and additional solder is conveyed away from the defect area before the solder re-solidifies eliminating the defect without introducing new defects.

2. A method for manufacturing Surface Mount Technology micro-electronic circuit assemblies comprising:

a. purposefully applying solder in liquid form to create solder bridges on electrically conductive terminals in the manufacture of Surface Mount Technology micro-electronic circuit assemblies;

b. while the solder is still liquefied, directing a gas blast jet onto the solder bridges of the said terminals with a rise time of approximately 0.1 seconds with a velocity of approximately 200 meters per second and cold temperature gas of 50 degrees Fahrenheit to 100 degrees Fahrenheit whereby the solder bridges are removed.

* * * * *